Larry L. Higgins,
INVENTOR.
BY.

Edward Dugas
AGENT.

Dec. 17, 1968   L. L. HIGGINS   3,416,369
FLUID VELOCITY MEASURING DEVICE
Filed Nov. 14, 1966   3 Sheets-Sheet 3

Larry L. Higgins,
INVENTOR.

BY.

Edward Dugas
AGENT.

United States Patent Office 3,416,369
Patented Dec. 17, 1968

3,416,369
FLUID VELOCITY MEASURING DEVICE
Larry L. Higgins, Hermosa Beach, Calif., assignor to TRW Inc., Redondo Beach, Calif., a corporation of Ohio
Filed Nov. 14, 1966, Ser. No. 594,026
4 Claims. (Cl. 73—194)

ABSTRACT OF THE DISCLOSURE

A fluid velocity measuring device wherein a first electrode is inserted into a conductive liquid, the velocity of which is to be measured. A conductive liquid solution, having a conductivity substantially different than the conductive liquid to be measured, is dispensed, substantially parallel and opposite to the flow of conductive liquid at a constant velocity. A second electrode is placed in contact with the liquid solution, with means connected across the electrodes for determining the conductivity between the electrodes which is proportional to the velocity of the conductive liquid.

---

Figure 1:
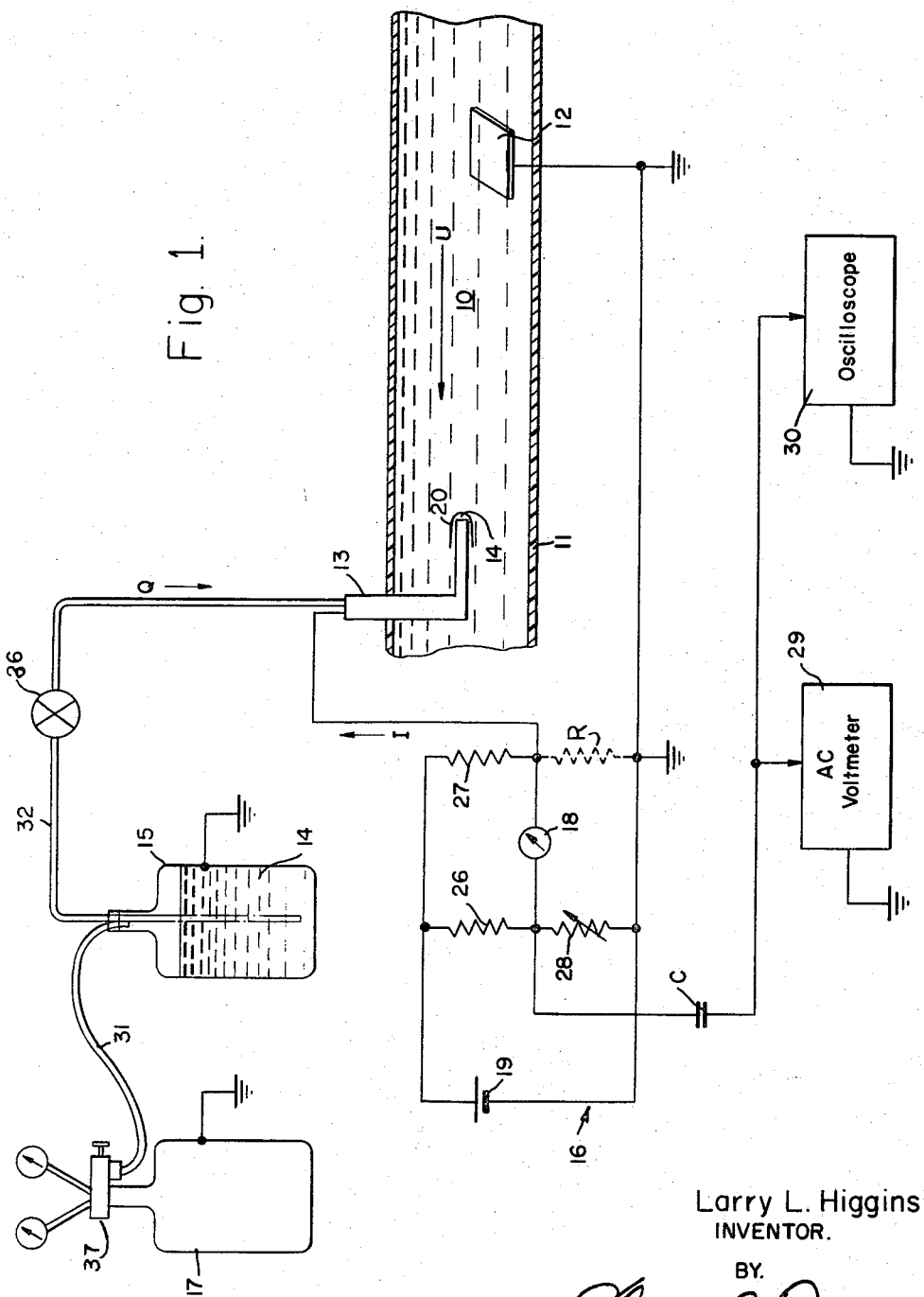

Numerous devices exist in the prior art for measuring the velocity of a fluid such as turning vane devices wherein the vanes are mechanically connected to a generator which provides an output signal directly proportional to the velocity of the fluid rotating the vanes. Another prior art device is a hot-wire or hot-film type device wherein the amount of heat dissipated from the hot-wire or film into the fluid is a function of the velocity of the fluid passing the device.

In the light of the prior art, it would be highly desirable to have a flow meter wherein there are no moving mechanical parts such as those which exist in turning vane type devices. It is also highly desirable to have a flow meter which responds specifically to fluid velocity fluctuations without subsidiary responses to fluctuations of other properties of the fluid medium such as fluctuations in temperature, acoustic pressures, or chemical concentrations as would normally occur with hot-wire or hot-film type devices. Still another prior art device is the piezo electric crystal type flow meter which provides an electrical output without the use of mechanically moving parts but is sensitive to the temperature and pressure fluctuations of the fluid. It will also be highly desirable to have an instrument wherein the calibration is stable and readily measurable for mean and fluctuating velocities. Some of the other desirable qualities of a velocity measuring device are: the device should be rugged to allow general handability and not be susceptible to mechanical vibration in turbulent flow; the sensing element should be small in order not to disturb the fluid flow and be capable of measuring fine scale turbulent velocities, for example, on the order of 0.5 mm.; the time response of the device should be short or its inertia changes low in order to respond to rapid fluctuations of velocity; the response of the device should depend on the direction of the fluid flow against it; the device should be usable in fluids of widely different characteristics; and the device should be operable in fluid in which contaminating or fouling matter such as bubbles, biological life or bits of matter are present. It is therefore highly desirable to have a low cost device possessing the above qualities.

It is therefore an object of the present invention to provide a unique and novel fluid velocity measuring device.

It is another object of the present invention to provide a device for measuring the velocity of fluids having widely different characteristics.

It is another object of the present invention to provide a device for measuring the velocity of fluid by purely electrical means.

It is another object of the invention to provide a device or measuring widely varying velocities of a fluid.

In one embodiment of the invention, the aforementioned objects are accomplished by inserting a first electrode into a conductive liquid, the velocity of which is to be measured. Means are provided for dispensing a liquid solution into the conductive liquid at a known velocity, the liquid solution having a conductivity substantially different from that of the conductive liquid. A second electrode is placed in contact with the liquid solution and means are provided for measuring the conductivity between the first and second electrode. Because the velocity of the liquid solution and its conductivity is known, the measuring device may be calibrated so that variation in the conductivity between the electrodes is directly proportionate to the velocity of the conductive liquid.

Figure 2:
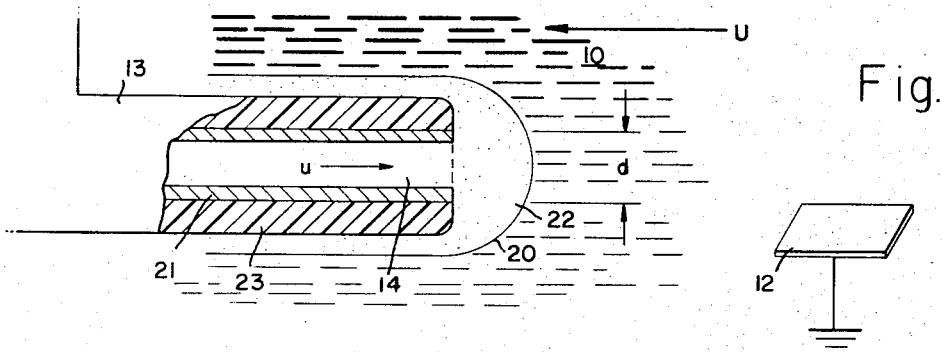
Figure 3:
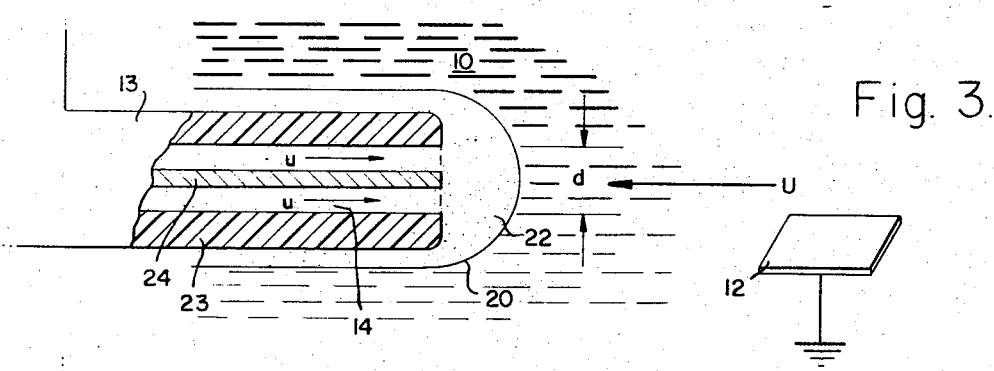
Figure 4:
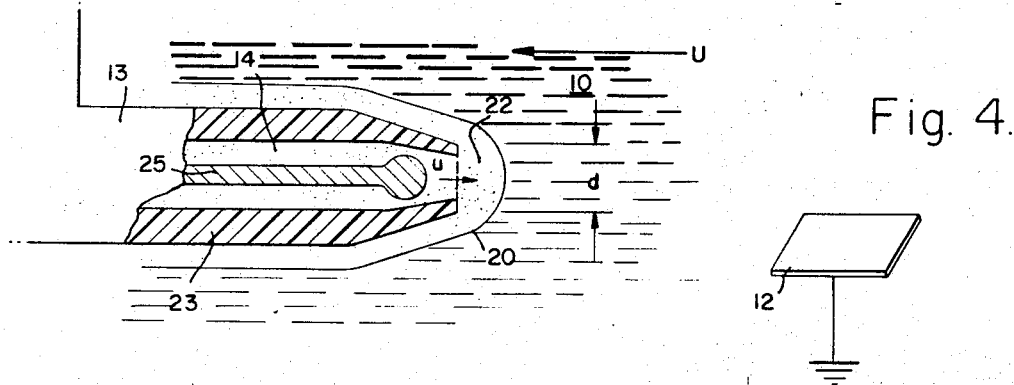
Figure 5A:
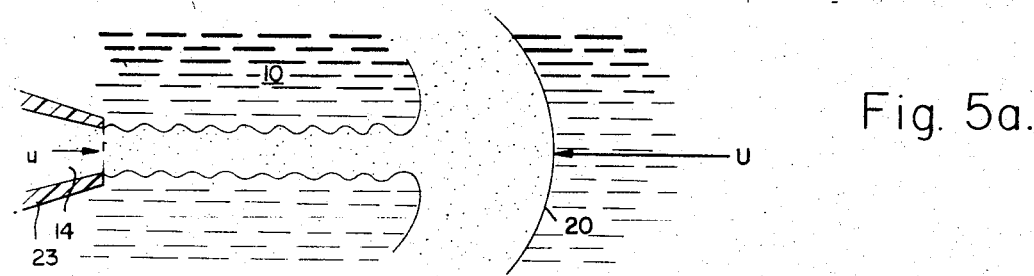
Figure 6:
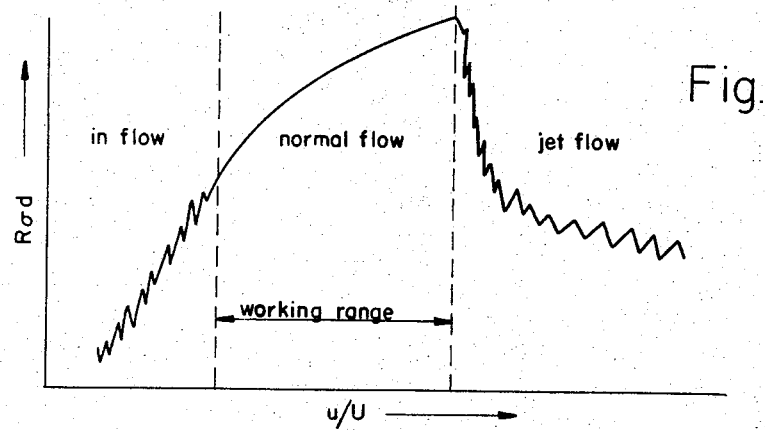
Figure 7:
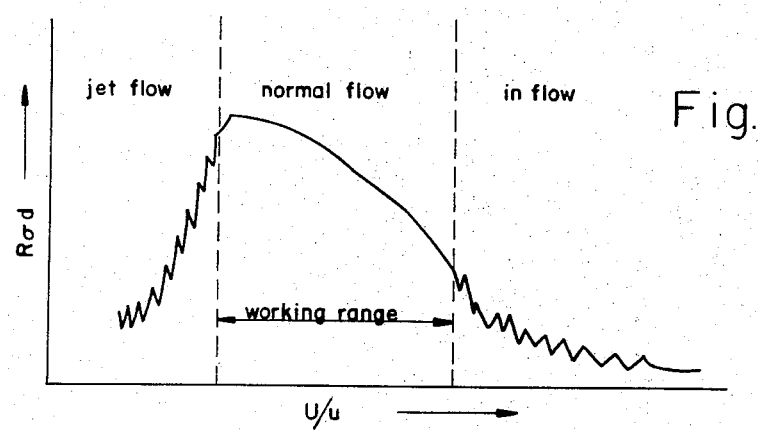

These and other objects of the present invention will become more apparent when taken in conjunction with the following description and drawings in which:

FIGURE 1 illustrates the preferred embodiment of the present invention;
FIGURE 2 is an enlarged sectional view of a portion of the embodiment illustrated in FIGURE 1;
FIGURE 3 is an enlarged sectional view of a portion of the device illustrated in FIGURE 1, showing a second embodiment of the invention;
FIGURE 4 is an enlarged cross-sectional view of a portion of the device illustrated in FIGURE 1, showing a third embodiment of the invention;
FIGURES 5A, B and C illustrate three operating conditions of the invention;
FIGURE 6 is a chart illustrating one operating condition of the present invention; and
FIGURE 7 is a chart illustrating a second operating condition of the present invention.

In FIGURES 1 and 2, the fluid 10 of electrical conductivity $\sigma_0$ flows within a conduit 11 and impinges on the non-conducting probe 13 at a free stream velocity U. At the same time, a special ionic solution 14 of electrical conductivity $\sigma$ issues from the tip of the probe at a velocity $u$ such that a stable liquid/liquid junction 20 is formed in the vicinity of the probe tip. A second electrode 21 is placed within the probe 13 so as to make electrical contact with the special ionic solution 14. An electrode 12 is immersed in the conductive fluid 10. Means 16, for detecting conductivity between electrode 21 and electrode 12, is connected across the electrodes respectively so as to provide an electrical current flow from electrode 21 through the special ionic solution 14 to the liquid junction 20 and through the fluid 10, whose velocity is to be determined, to the electrode 12. This detecting means may be a standard bridge type circuit. The conductivity $\sigma$ of the special ionic solution is chosen such that it is less than (and preferably very much less than) that of the conductive fluid 10 $\sigma_0$. The electrical resistance between electrode 21 and electrode 12 is determined, in this case, primarily by the region 22 of the special solution since the resistance from the liquid junction 22 to electrode 12 is relatively small. If $d$ is the typical dimension of the sensitive region 22 and Q is the flow of the special liquid solution 14 (volume per unit), then it follows that:

$$Q = ud^2 \simeq Ud^2$$

At $U = 3$ knots $= 154$ cm./sec. and $d = 0.05$ cm., the flow Q is of the order of 0.4 cm.$^3$/sec.; consequently, only a small amount of solution is required, for example, a gallon will last for three hours. The position of the liquid junction 20 relative to the probe tip is determined by the momentum density of the special liquid solution $\rho u$ relative to the momentum density of the conductive fluid $\rho_0 U$ under measurement, where $\rho$ and $\rho_0$ are the densities of the special liquid solution and the conductive fluid, respectively. If these two densities are substantially equal, that is, $\rho = \rho_0$, and indeed it is desirable to do so to make the liquid junction "invisible" to acoustic pressures, then the geometry or shape of the region 22 is determined solely by the ratio $u/U$ or, for a given probe shape, by the ratio $Q/U$. Consequently, the resistance between electrodes 21 and 12 is also determined by these ratios and a measure of the probe resistance is a measure of fluid velocity if the properties of the probe are known and calibrated.

Means 16 is shown comprised of a source of potential 19 connected in circuit across a bridge arm resistance 26 and a serially connected variable resistance 28. Connected in parallel with resistances 26 and 28 is the combination of resistors 27 and the simulated probe resistance R. Resistance R is the resistance an ohmmeter would see if it were connected across electrodes 21 and 12. An ammeter 18 connects the junction of resistors 26 and 28 to the junction of resistors R and 27.

Figure 5B:
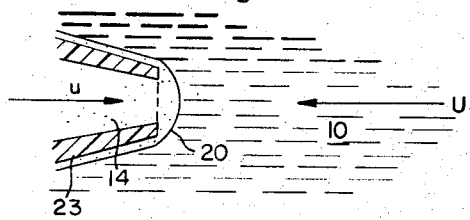
Figure 5C:
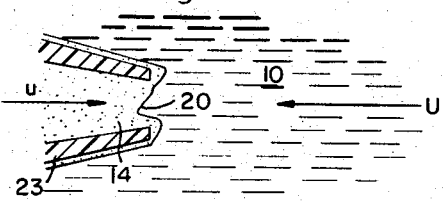

Referring to FIGURES 5A, 5B and 5C, the behavior of the sensitive volume 22 on fluid velocity, U, is as follows: as U increases, the liquid junction 20 is forced closer to the probe body 13 for a constant Q flow. If U decreases, the liquid junction 20 is forced away from the probe body. Drastic changes in the flow pattern will occur, however, if U becomes too large or too small with respect to the solution velocity $u$. For example, if $u/U$ becomes too large, the normal flow of the solution becomes unstable and changes over to "jet flow," and the special solution no longer flows back smoothly over the probe tip, but emerges into a (turbulent) jet directed against the oncoming fluid. On the other hand, if $u/U$ becomes too small, the normal flow again becomes unstable such that the oncoming fluid tends to enter inside the tube or region where the special solution originates. Transition to these two types of flow is abrupt and occurs at certain fixed critical values of the relation $u/U$. Since these two types of flow are unstable, random fluctuations in the region 22 take place which are unrelated to the fluid velocity U. Thus, the "jet flow" and "in-flow" situations are to be avoided, and measurements should only be made in the working range of the ratio in which the flow is "normal" and stable. The dynamic range of the allowed values of the ratio $u/U$ depends on U and $d$ because of the viscosity of the solution and fluid.

The variation of probe resistance R with flow conditions is now considered. Assuming the conductivity of the conductive fluid is much greater than that of the special solution, then the dimensionless number which describes the shape of the region 22 is $R\sigma d$. If this number is measured as a function of the relative magnitude of fluid velocity, U, or solution velocity, $u$ (which is directly proportional to Q), the curves of the form shown in FIGURES 6 and 7 are obtained. In the working range of the probe, the resistance is an increasing function of the ratio $u/U$.

The higher the solution flow for a constant U, the farther the liquid junction 20 is from the electrode 21, and the greater the resistance. When $u/U$ exceeds the critical value for jet flow, the resistance drops abruptly because the liquid electrode geometry of this type of flow corresponds to low resistance. The resistance in this region has a random fluctuation of above an average value since the flow is unstable. At the other extreme, when $u/U$ is low, the probe goes over to the "in-flow" condition, where the liquid junction 20 comes to the inner electrode 21 and the resistance becomes very low. In this region, the resistance fluctuates because the flow is unstable.

The response of the probe is linear with respect to fluid velocity U if the liquid junction geometry is held constant by adjusting the solution flow Q. This flow control is done conventionally by forcing the special solution with a high pressure, P, from a pressure source such as compressed gas. Referring back to FIGURE 1, such a pressure source is shown as means 17. The special solution under high pressure is passed through a small orifice or small diameter tubes 31 and 32 to the probe 13. The solution flow is laminar when Q is proportional to P, and U is proportional to P. An automatic electronic pressure regulator 37 accomplishes this in an analogous way to the way a hot-wire or hot-film is maintained in constant-temperature-operation. In constant-flow-operation the response is non-linear as is shown in FIGURE 7. The sensitivity of the probe is the constant of proportionality between a small relative resistance change $\delta R/R$ and a small relative velocity change $\delta U/U$ for a constant flow. The sensitivity coefficient depends on the operating point in the working range but a typical value is:

$$\frac{\delta R}{R} \simeq \frac{1}{10} \frac{\delta U}{U}$$

The maximum value for the sensitivity coefficient is about 0.5.

The bridge circuit 16 measures the mean velocity of the fluid by settings of the potentiometer 28. Rapidly fluctuating fluid velocities are measured through the coupling capacitor C with the AC volt meter 29 and the oscilloscope 30. For a fixed potentiometer setting, the electrical current in the ammeter 18 increases as the velocity increases. The solution flow is monitered by the high pressure on the solution flask 15 and the calibrated metering valve 36. A high pressure P is desirable so that the stagnation pressure $\frac{1}{2}\rho U^2$ at the probe tip does not change the solution flow appreciably. A conducting path from electrode 21 to ground potential other than that through the region 22 exists. That path is along the tube which leads from the solution bottle 15 and metering valve, which are held at ground potential for convenience. This other path can be made of negligible importance by making it a very high resistance. To do this, a very long and small diameter non-conducting tube is used to supply the special solution to the probe.

The response of the probe is determined by the typical dimension of the sensitive region 22. This dimension may easily be made of the order of 0.5 mm. or smaller. The time response of the probe depends on the inertia of the sensitive volume, the electrical resistance and capacity of the probe, associated wire, and electronics. If the eddies of fluid fluctuations are larger or comparable to the size of the sensitive volume, the small inertia of the sensitive volume is of negligible importance. The special solution which is made to originate from a high impedance source is consequently of no importance in determining the time response of the probe. Since the probe may have a high electrical resistance care must be taken to keep the probe's electrical capacity low.

The special solution 14 should have a conductivity much less than that of the conductive liquid 10. Such a solution may be made by mixing 10 parts of distilled water with one part of the fluid being measured, for example, tap water. To effectively use the special solution, the inner-electrode 21 must be the anode and of a suitable metal such as iron or copper; otherwise, gas bubbles form on the electrode 21 due to electrolysis, which would make resistance measurements erratic and unstable. The other electrode 12 which is at ground potential is unimportant even if bubbles form on it because of its low contribution to over-all resistance of the probe. It is possible by careful selection to match the special solution and electrode 21 such that a harmonious and stable electro-chemical reaction takes place. For example, a pure copper electrode in a very dilute copper sulfate solution will allow electrode 21 to be used as either an anode or a cathode without bubble formation. Other more sophisticated solutions and electrode materials may be chosen to further optimize the performance. A low-conductivity solution with resulting high pressure probe rather than the reverse situation is the most desirable one for optimizing the electro-chemical reaction. Thus, the high voltage supplied to the electrode is large in comparison with the contact potential between electrode material and ionic solution.

As the conductivity of the special solution increases and approaches that of the fluid, the sensitivity of the probe falls to zero since the position of the liquid junction is irrelevant. However, if the two conductivities differ by a factor of approximately two or more, the technique is applicable. The reason for making the two conductivities greatly different is not just to increase the sensitivity, but to insure its spesificity to velocity variations. Since, if the conductivity of the fluid plays an important role in determining the probe resistance, then the probe is responsive also to the fluid's conductivity. The fluid conductivity is sensitive to temperature and to salt concentrations in the fluid. Thus, to avoid this problem, the conductivity of the special solution is made very low relative to that of the fluid. Even in this case, however, the probe is not completely specific to velocity since the momentum density of the fluid which is the primary quantity that determines the shape of liquid junction, depends on the density of the fluid, which in turn depends to a small extent on the temperature and salinity of the fluid. The temperature coefficient of density is, however, about one hundred times less than that of the conductivity and the salinity coefficient of density is about $\frac{1}{30}$ of that of the conductivity. Thus, if the conductivity of the special solution is more than one hundred times less than that of the fluid, then the specificity to velocity is one hundred times better than that of the hot-wire or hot-film device.

The probe of this invention is not susceptible to fouling by bits of matter impinging on the tip because the special solution which originates from a high pressure source forces such cloggings out of the tip and automatically cleans the probe.

While there have been shown what is considered to be a preferred embodiment of the invention, it will be manifest that many changes and modifications may be made therein without departing from the essential spirit of the invention. It is intended, therefore, in the annexed claims, to cover all such changes and modifications as fall within the true scope of the invention.

What is claimed is:

1. A flowmeter for measuring the velocity of a conductive fluid comprising in combination:

a first electrode immersed in said conductive fluid;

means providing a conductive solution dispensed in said conductive fluid substantially parallel and opposite to the flow of said conductive fluid, said conductive solution dispensed at a known velocity, said conductive solution having a conductivity substantially different from that of said conductive fluid;

second electrode means immersed in said conductive solution; and means measuring the conductivity between said first and said second electrodes wherein said measured conductivity is a function of the velocity of said conductive fluid.

2. The invention according to claim 1 wherein the conductivity of said solution is substantially less than the conductivity of said conductive fluid.

3. The invention according to claim 1 wherein said means for providing a conductive solution is comprised of:

a source of conducting solution under pressure;

a hollow probe immersed in said conductive fluid and means coupling said conducting solution to said hollow probe.

4. A flowmeter as defined in claim 1 wherein said conductive solution is dispensed at such a velocity with respect to the velocity range of said conductive fluid so as to generate a substantially nonturbulent fluid junction between said fluid and said solution.

References Cited

UNITED STATES PATENTS

| 2,838,378 | 6/1958 | Shawhan | 324—30 X |
| 3,324,720 | 6/1967 | Sutherland | 324—65 X |
| 3,312,106 | 4/1967 | Davis | 73—209 X |

RICHARD C. QUEISSER, *Primary Examiner.*

EDWARD D. GILHOOLY, *Assistant Examiner.*

U.S. Cl. X.R.

324—65